United States Patent
Cao et al.

(10) Patent No.: US 12,503,523 B2
(45) Date of Patent: Dec. 23, 2025

(54) CATALYST COMPOSITION FOR POLYMERIZATION OF α-OLEFIN AND PREPARATION AND USE THEREOF

(71) Applicant: PetroChina Company Limited, Beijing (CN)

(72) Inventors: Yuanyuan Cao, Beijing (CN); Tong Liu, Beijing (CN); Hongling Chu, Beijing (CN); Libo Wang, Beijing (CN); Yulong Wang, Beijing (CN); Xianming Xu, Beijing (CN); Xiuhui Wang, Beijing (CN); Han Gao, Beijing (CN); Wei Sun, Beijing (CN); Hongpeng Li, Beijing (CN)

(73) Assignee: PetroChina Company Limited, Beijing (CN)

( * ) Notice: Subject to any disclaimer, the term of this patent is extended or adjusted under 35 U.S.C. 154(b) by 244 days.

(21) Appl. No.: 18/248,198

(22) PCT Filed: Jan. 7, 2022

(86) PCT No.: PCT/CN2022/070680
§ 371 (c)(1),
(2) Date: Apr. 6, 2023

(87) PCT Pub. No.: WO2022/217985
PCT Pub. Date: Oct. 20, 2022

(65) Prior Publication Data
US 2023/0374169 A1    Nov. 23, 2023

(30) Foreign Application Priority Data
Apr. 15, 2021 (CN) .......................... 202110405183.5

(51) Int. Cl.
| | | |
|---|---|---|
| *C08F 4/14* | (2006.01) | |
| *C08F 4/32* | (2006.01) | |
| *C08F 110/14* | (2006.01) | |

(52) U.S. Cl.
CPC .................. *C08F 4/14* (2013.01); *C08F 4/32* (2013.01); *C08F 110/14* (2013.01); *C08F 2410/04* (2013.01)

(58) Field of Classification Search
None
See application file for complete search history.

(56) References Cited

U.S. PATENT DOCUMENTS

| | | |
|---|---|---|
| 3,149,178 A | 9/1964 | Hamilton et al. |
| 3,382,291 A | 5/1968 | Brennan |

(Continued)

FOREIGN PATENT DOCUMENTS

| | | |
|---|---|---|
| CN | 1274725 C | 9/2006 |
| CN | 1948243 A | 4/2007 |

(Continued)

OTHER PUBLICATIONS

Chinese Patent Office Action for Application No. 202110405183.5, dated Jun. 28, 2024 (19 pages with translation).

(Continued)

*Primary Examiner* — Catherine S Branch
(74) *Attorney, Agent, or Firm* — Michael Best & Friedrich LLP

(57) ABSTRACT

The present disclosure discloses a catalyst composition for polymerization of an α-olefin and preparation and use thereof. The catalyst composition comprises boron trifluoride and at least one protic cocatalyst; the protic cocatalyst has a structural formula of X—$(CH_2)_n$—OH, where n is an integer selected from 1 to 10; X is selected from nitro, halogen, cyano, sulfonic acid group, aldehyde group, acyl, (Continued)

carboxyl and amino. The catalyst can be used in production of a poly(α-olefin) synthetic base oil, and is particularly suitable for a low viscosity poly(α-olefin) synthetic base oil with high selectivity of the target product.

19 Claims, 3 Drawing Sheets

(56) References Cited

U.S. PATENT DOCUMENTS

| | | | |
|---|---|---|---|
| 3,742,082 | A | 6/1973 | Brennan |
| 3,763,244 | A | 10/1973 | Shubkin |
| 3,780,128 | A | 12/1973 | Shubkin |
| 4,172,855 | A | 10/1979 | Shubkin |
| 4,956,122 | A | 9/1990 | Watts et al. |
| 5,068,487 | A | 11/1991 | Theriot |
| 5,191,140 | A | 3/1993 | Akatsu et al. |
| 5,420,373 | A | 5/1995 | Hope et al. |
| 2003/0166986 | A1 | 9/2003 | Clarembeau |
| 2009/0143551 | A1 | 6/2009 | Qin et al. |
| 2009/0240012 | A1 | 9/2009 | Patil et al. |
| 2009/0281360 | A1 | 11/2009 | Knowles et al. |
| 2011/0039743 | A1 | 2/2011 | Bagheri et al. |
| 2019/0359747 | A1* | 11/2019 | Baxter, Jr. ............ B01J 31/22 |

FOREIGN PATENT DOCUMENTS

| | | |
|---|---|---|
| CN | 101054332 A | 10/2007 |
| CN | 101877879 A | 11/2010 |
| CN | 101883838 A | 11/2010 |
| CN | 102015787 A | 4/2011 |
| CN | 102924208 A | 2/2013 |
| CN | 101883838 B | 3/2014 |
| CN | 104160003 B | 1/2016 |
| CN | 105925340 A | 9/2016 |
| CN | 108251155 A | 7/2018 |
| CN | 111450778 A | 7/2020 |
| CN | 111689995 A | 9/2020 |
| EP | 0477673 A1 | 4/1992 |
| RU | 2212936 C2 | 9/2003 |
| WO | 2001005857 A1 | 1/2001 |

OTHER PUBLICATIONS

International Search Report for corresponding International Application No. PCT/CN2022/070680, dated Apr. 1, 2022.
Chu Hongling et al., "Synthesis of low viscosity poly-alpha-olefins lubricant base oil from boron trifluoride/acetic acid catalyzed 1-decene," Chemical Industry and Engineering Progress, 2018, vol. 37, No. 8, pp. 3016-3020.
Russian Patent Office First Office Action and Search Report for Application No. 2023104192, dated Oct. 27, 2023 (14 pages, including translation).
Saudi Arabia Patent Office Action for Application No. 523440197, dated Dec. 6, 2023 (15 pages, including translation).

* cited by examiner

CATALYST COMPOSITION FOR POLYMERIZATION OF α-OLEFIN AND PREPARATION AND USE THEREOF

CROSS REFERENCE TO RELATED APPLICATIONS

The present application is a U.S. National Phase of International Application No. PCT/CN2022/070680 filed Jan. 7, 2022, which claims priority to Chinese Patent Application No. CN 202110405183.5 filed Apr. 15, 2021, the entire contents of both of which are herein incorporated by reference.

FIELD OF THE INVENTION

The present disclosure relates to the technical field of poly(α-olefin) synthetic base oil, and specifically to a catalyst composition for polymerization of an α-olefin and preparation and application thereof.

BACKGROUND OF THE INVENTION

Poly(α-olefin) (PAO) synthetic oil is currently the best performance synthetic lubricant base oil, with high viscosity index, low volatility, low fluidity, good shear properties and excellent high temperature oxidation resistance; as compared with traditional mineral lubricant base oil (Group I, II, III base oil), PAO has the characteristics of small evaporation loss, good stability, wide operating temperature range, good compatibility with common materials and non-toxic, etc. It is not only widely used in civil industries such as automobile and industry, but also the main source of high-grade lubricant base oil used in aviation, aerospace and military industries.

PAO is generally a class of branched and saturated oligomers formed by the catalytic oligomerization of $C_6$-$C_{16}$ α-olefins. The catalytic polymerization of α-olefins is a known technology for producing PAO synthetic lubricant. In general, the catalyst systems commonly used for the preparation of PAO include $BF_3$ system, Cr system, Al compound system, Ziegler-Natta, metallocene, and ionic liquid. The selection of different types of catalysts has a significant effect on the yield of the polymer, the control of the polymerization degree and the performance of the product. The PAO synthetic oils prepared by Lewis acid type catalysts have high yield and narrow molecular weight distribution, so $BF_3$ and initiator chosen as a catalytic system for the preparation of low viscosity poly(α-olefin) synthetic oil base oil have a good effect.

When low viscosity PAO is produced by $BF_3$ catalytic system, the product is mainly trimer, tetramer and pentamer with narrow product distribution, which is an ideal component in the viscosity range of 4 to 6 cSt. Meanwhile, according to the results of PAO structure and performance study, straight-chain alkanes have high viscosity index but poor low-temperature performance, and only alkanes with a certain degree of isomerization, i.e. reasonable isomerization, are ideal components for lubricants. Therefore, the selection of a suitable cationic catalytic system, which undergoes a certain degree of isomerization in the presence of catalytically active centers, is able to obtain PAO base oils with excellent overall performance.

U.S. Pat. No. 3,763,244 discloses the preparation of lubricating oil base oils using a $BF_3$/water system catalyzed by α-olefins from $C_6$ to $C_{16}$, using water as an initiator at a reaction temperature of 10 to 60° C., wherein the molar ratio of water to trifluoroboride is to be in excess, and the product under the action of this catalyst system has a low pour point and a high viscosity index. U.S. Pat. No. 5,191,140A uses boron trifluoride as the main catalyst and water or alcohols and acetic anhydride as cocatalysts to obtain a product with a kinematic viscosity of 3.58 cSt at 100° C. and a viscosity index of 125 with an olefin conversion of 76.8% by the polymerization reaction of olefins. This method can improve the yield of low-viscosity olefin oligomers and increase the production efficiency by reducing the reaction time. U.S. Pat. No. 3,742,082A discloses a method of catalyzing α-olefins with $BF_3$ as the main catalyst and phosphoric acid or water as the cocatalyst, with a molar ratio of catalyst to olefin of 0.005:1 to 0.1:1 and a reaction temperature of 100 to 150° C. The obtained base oil products have a low pour point. The above patent uses water as a cocatalyst, which has better product performance and catalytic efficiency, and reduces production costs, but is particularly prone to corrosion problems, thus requiring an increase in the corrosion resistance level of the material, which can significantly increase the investment cost of the device, so this type of method is not suitable for large-scale production.

In the subsequent catalyst technology development, there are some related reports based on $BF_3$ as the main catalyst and alcohols, ethers, esters and ketones as cocatalysts, while alcohols as cocatalysts are predominant in the literature. CN1274725C provided a poly(α-olefin) base oil with a kinematic viscosity of 4 to 6 cSt at 100° C., a Noack weight loss of 4 to 9%, a viscosity index of 130 to 145, and a pour point of −60° C. to −50° C., obtained by an oligomerization reaction at a temperature of 20° C. to 60° C. in the presence of $BF_3$ catalyst and an alcohol cocatalyst, but the yield of the target product component was only 70% upon a compositional analysis. CN101883838A produced a base oil by using α-olefins of $C_8$ to $C_{12}$ as raw materials for polymerization with boron trifluoride-butanol catalyst, and then separating the unreacted raw materials and dimer followed by hydrogenation and refining of the vacuum distillate. The product had a kinematic viscosity of 5 $mm^2$/s at 100° C., a pour point below −50° C., and a viscosity below 3000 cSt at −40° C. CN105925340A used $BF_3$ as a catalyst, an alcohol or alkyl ester as a cocatalyst, and decene-1 and dodecene-1 in a ratio of 7:3 as raw materials. The reaction was carried out at 18° C. under 0.2 MPa, and the co-initiator was ethanol:ethyl acetate in a ratio of 12:1. The oligomer product has a kinematic viscosity of 4 $mm^2$/s at 100° C., and a pour point of less than −60° C., but the product yield was less than 80%. CN101054332A used boron trifluoride as a catalyst and an alcohol, which was methanol, ethanol, propanol, butanol or pentanol, as an initiator, wherein the weight ratio of the initiator to the raw material olefin was 0.01-1.0%, and the weight ratio of $BF_3$ to the raw material olefin was 1-5%.

For the traditional catalytic system used to produce low-viscosity PAO, although the viscosity-temperature property and low-temperature property of the product are relatively good, the degree of isomerization of the oligomeric product formed after the effect of Lewis acid catalysts and cocatalysts such as alcohols, esters and ethers in the polymerization reaction is not controllable, and the properties of the product are greatly affected by the process conditions, and the product stability is poor, in addition to a low selectivity of the ideal components with a viscosity ranging from 4 to 6 cSt. Therefore, in order to solve the above problems, there is a need to develop novel cocatalysts to improve the selectivity of the target products (trimers and tetramers).

SUMMARY OF THE INVENTION

Aiming at the deficiencies in existing catalytic systems, the present disclosure proposes a new protic cocatalyst for the boron trifluoride catalytic system, and develops a catalyst composition for polymerization of an α-olefins, so as to achieve the stereospecific polymerization of the α-olefins with a high selectivity of the target product.

A first object of the present disclosure is to provide a catalyst composition for polymerization of an α-olefins.

A second object of the present disclosure is to provide a method for preparing the catalyst composition for polymerization of an α-olefins.

A third object of the present disclosure is to provide use of the catalyst composition for polymerization of an α-olefins.

In order to achieve the above objects, the present disclosure uses the following technical solutions.

A first aspect of the present disclosure provides a catalyst composition for polymerization of an α-olefin, comprising boron trifluoride and at least one protic cocatalyst;

wherein the protic cocatalyst has a structural formula of:

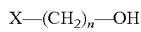

X—(CH$_2$)$_n$—OH where n is an integer selected from 1 to 10;

X is selected from nitro (—NO$_2$), halogen, cyano (—CN), sulfonic acid group (—SO$_3$H), aldehyde group (—CHO), acyl (—COR, where R is alkyl), carboxyl (—COOH), and amino (—NH$_2$).

During the development of the present disclosure, a variety of different cocatalysts were designed and selected. During the experiments, it was surprisingly found that the introduction of a variety of different functional groups in the same molecule was able to control the degree of isomerization of the base oil and improve the selectivity of the target products (trimers and tetramers).

The long-chain α-olefin cationic polymerization reaction undergoes five steps: catalyst complexation, initiation, chain growth, chain transfer and chain termination. Among them, the disassociation ability of carbon positive ion affects the acidity of the active center and the yield of the reaction product; the stability of the carbon positive ion intermediate affects the polymerization regularity.

The catalyst composition provided by the present disclosure is used to prepare a low viscosity PAO synthetic base oil. As compared with the traditional catalytic system, a protic cocatalyst is introduced to form a composite catalytic system with the main catalyst, which influences the dissociation ability of carbon positive ions (i.e., the ability to release H$^+$) through the heteroatom-inducing effect in the protic cocatalyst, thus regulating the acidity of the catalytic system, improving the stability of the active center, controlling the degree of product isomerization, solving the difficulty of regular polymerization of long-chain α-olefin molecules at the active site, realizing a narrow molecular weight oligomerization of α-olefins, improving the selectivity of target products, and preparing low-viscosity PAO products with excellent viscosity-temperature property and low-temperature property.

Specifically, both a hydroxyl group and another functional group X are included in the structure of the finally selected protic cocatalyst of the present disclosure. The X group can be specifically nitro, halogen, cyano, sulfonic acid group, aldehyde group, acyl, carboxyl and amino, and regulate the acidity of the catalytic system through the heteroatom-inducing effect and thus affects the dissociation ability of carbon positive ion and H$^+$.

In the catalyst composition according to the present disclosure, preferably, the acyl group is —COR, where R is alkyl, preferably methyl.

In the catalyst composition according to the present disclosure, preferably, the halogen comprises fluorine (—F), chlorine (—Cl), bromine (—Br) and iodine (—I).

In the catalyst composition according to the present disclosure, preferably, a molar ratio of boron trifluoride to the protic cocatalyst is from 0.1 to 3.0, preferably from 0.5 to 2.0, more preferably from 0.8 to 1.5.

In the catalyst composition according to the present disclosure, preferably, the protic cocatalyst is one or a combination of two or more selected from 2-nitroethanol, 3-nitropropanol, 2-chloroethanol, 3-chloro-1-propanol, 4-chloro-1-butanol, 5-chloro-1-pentanol, 6-chloro-1-hexanol, 7-chloro-1-heptanol, 8-chloro-1-octanol, 9-chloro-1-nonanol, 10-chloro-1-decanol, 2-fluoroethanol, 3-fluoro-1-propanol, 4-fluoro-1-butanol, 5-fluoro-1-pentanol, 6-fluoro-1-hexanol, 7-fluoro-1-heptanol, 8-fluoro-1-octanol, 9-fluoro-1-nonanol, 10-fluoro-1-decanol, 2-bromoethanol, 3-bromo-1-propanol, 4-bromo-1-butanol, 5-bromo-1-pentanol, 6-bromo-1-hexanol, 7-bromo-1-heptanol, 8-bromo-1-octanol, 9-bromo-1-nonanol, 10-bromo-1-decanol, 2-iodoethanol, 3-iodo-1-propanol, 4-iodo-1-butanol, 5-iodo-1-pentanol, 6-iodo-1-hexanol, 7-iodo-1-heptanol, 8-iodo-1-octanol, 9-iodo-1-nonanol, 10-iodo-1-decanol, 3-hydroxypropionitrile, 4-hydroxybutyronitrile, 2-hydroxyethanesulfonic acid, 3-hydroxypropanesulfonic acid, 4-hydroxybutanesulfonic acid, hydroxyacetaldehyde, 3-hydroxypropionaldehyde, 4-hydroxybutyraldehyde, 5-hydroxyvaleraldehyde, 6-hydroxyhexanal, 8-hydroxyoctanal, 6-hydroxy-2-hexanone, 5-hydroxy-2-hexanone, hydroxyacetic acid, 3-hydroxypropionic acid, 4-hydroxybutyric acid, 6-hydroxyhexanoic acid, 7-hydroxyheptanoic acid, 8-hydroxyoctanoic acid, 9-hydroxynonanoic acid, 10-hydroxydecanoic acid, 3-amino-1-propanol, 4-amino-1-butanol, 5-amino-1-pentanol, 6-amino-1-hexanol, 7-amino-1-heptanol, 8-amino-1-octanol, and 10-amino-1-decanol.

In the catalyst composition according to the present disclosure, preferably, the protic cocatalyst is one or a combination of two or more selected from 4-fluoro-1-butanol, 3-chloro-1-propanol, 3-iodo-1-propanol, 4-bromo-1-butanol, 6-hydroxyhexanoic acid, 3-nitropropanol, 2-hydroxyethanesulfonic acid, 4-hydroxybutanesulfonic acid, 6-hydroxy-2-hexanone, 5-hydroxypentanal, 8-hydroxyoctanoic acid and 10-hydroxydecanoic acid.

In the catalyst composition according to the present disclosure, preferably, X in the protic cocatalyst is selected from halogen and carboxyl.

In the catalyst composition according to the present disclosure, preferably, the protic cocatalyst is one or a combination of two or more selected from 4-fluoro-1-butanol, 4-bromo-1-butanol and 8-hydroxyoctanoic acid, and a molar ratio of boron trifluoride to the protic cocatalyst is from 1 to 1.2.

A second aspect of the present disclosure provides a method for preparing the catalyst composition, comprising: mixing the protic cocatalyst with the main catalyst boron trifluoride and carrying out a reaction at a predetermined temperature for a predetermined time to obtain the catalyst composition.

In the preparation method according to the present disclosure, preferably, the mixing the protic cocatalyst with boron trifluoride comprises: thermally purging with nitrogen a reactor for preparing a catalyst; after purging with nitrogen, adding the protic cocatalyst while turning on stirring; raising the temperature to a predetermined temperature; and adding boron trifluoride in proportion. The reactor for preparing the catalyst is a closed vessel, and is thermally purged with nitrogen to remove water and oxygen.

Preferably, in the preparation method according to the present disclosure, the predetermined temperature is −30° C. to 50° C., preferably −10° C. to 30° C.

Preferably, in the preparation method according to the present disclosure, the predetermined time is 0.5 h to 4.0 h, preferably 0.5 h to 3.0 h.

Preferably, in the preparation method according to the present disclosure, the protic cocatalyst has been subjected to a refining treatment.

Preferably, in the preparation method according to the present disclosure, the refining treatment includes but is not limited to distillation, adsorbent removal method and the like, and the water content of the protic cocatalyst after the refining treatment is less than 100 ppm.

The preparation method comprises: thermally purging with nitrogen a reactor for preparing a catalyst for 5 min to 10 min; after purging with nitrogen, adding the refined protic cocatalyst while turning on stirring; controlling the temperature at −30° C. to 50° C.; adding boron trifluoride in proportion; and reacting for 0.5 h to 4.0 h to obtain the catalyst composition.

A third aspect of the present disclosure provides use of the catalyst composition in synthesis of a poly(α-olefin) synthetic base oil, i.e., a method for preparing a poly(α-olefin) synthetic base oil using the catalyst composition.

Preferably, in the use according to the present disclosure, the use comprises the following step of:

adding a raw material α-olefin to a tank polymerization reactor; adding the catalyst composition continuously to the tank polymerization reactor; controlling the reaction temperature at 20° C. to 50° C. (preferably 25° C.) with a residence time of 20 min to 100 min; after the reaction, separating the catalyst, and carrying out hydrogenation to obtain the poly(α-olefin) synthetic base oil.

Preferably, in the use according to the present disclosure, the catalyst composition is added in an amount of 0.1% to 2.0% by mass of the raw material α-olefin.

The catalyst composition of the present disclosure can be used to produce a poly(α-olefin) synthetic base oil, especially suitable for the preparation of a low-viscosity poly(α-olefin) synthetic base oil, and the obtained polymerization products mainly include dimer, trimer, tetramer and pentamer. Herein, by adjusting the ratio of Lewis acid to the protic cocatalyst, unexpected test results were obtained, and the chromatographic analysis showed that the trimer and tetramer could reach 90% or more, and in addition, the viscosity of poly(α-olefin) synthetic base oil was 4.02 mm$^2$/s with a viscosity index of 132 and a pour point <−60° C.

As compared with the prior art, the present disclosure aims at the deficiencies in the existing catalytic systems and provides a catalyst composition that can be used for preparation of low-viscosity poly(α-olefin) synthetic base oils, which is mainly advantageous in:

(1) the catalyst composition of the present disclosure introduces a protic cocatalyst to form a composite catalytic system with the main catalyst, which influences the dissociation ability of carbon positive ions and H$^+$ through the heteroatom-inducing effect in the protic cocatalyst, thus regulating the acidity of the catalytic system, improving the stability of the active center, controlling the degree of product isomerization, solving the difficulty of regular polymerization of long-chain α-olefin molecules at the active site, realizing a narrow molecular weight oligomerization of α-olefins, and improving the selectivity of target products.

(2) the poly(α-olefin) synthetic base oil obtained by using the catalyst composition of the present disclosure has a high viscosity index, a good quality and a high yield of the target product.

DETAILED DESCRIPTION OF THE EMBODIMENTS

In order to illustrate the present disclosure more clearly, the present disclosure is further described below in connection with preferred embodiments. It should be understood by those skilled in the art that what is specifically described below is illustrative and not limiting and should not be used to limit the protection scope of the present disclosure.

All numerical designations of the present disclosure (e.g., temperature, time, concentration, and weight, including ranges for each of these) may generally be approximated by varying (+) or (−) in appropriate increments of 0.1 or 1.0. All numerical designations can be understood to be preceded by the term "approximately".

The cocatalysts in the following examples are obtained commercially and refined to remove as much impurities and moisture as possible. Specific refining treatments include, but are not limited to, conventional process methods such as distillation or physical adsorption, and the water content of the refined protic cocatalyst is less than 100 ppm.

Example 1

The example prepared a catalyst composition, specifically comprising the following steps.

The reactor for preparing the catalyst was thermally purged with nitrogen for 10 min, and after purging with nitrogen, a refined cocatalyst 4-fluoro-1-butanol (1 mol) was added, while stirring was turned on, and the temperature was raised to 50° C. The main catalyst boron trifluoride was added in proportion, and the molar ratio of the main catalyst to the cocatalyst was 0.1:1. After 0.5 h of reaction, the prepared polymerization catalyst (boron trifluoride-4-fluoro-1-butanol complex) was obtained and stored for use.

Figure 1:
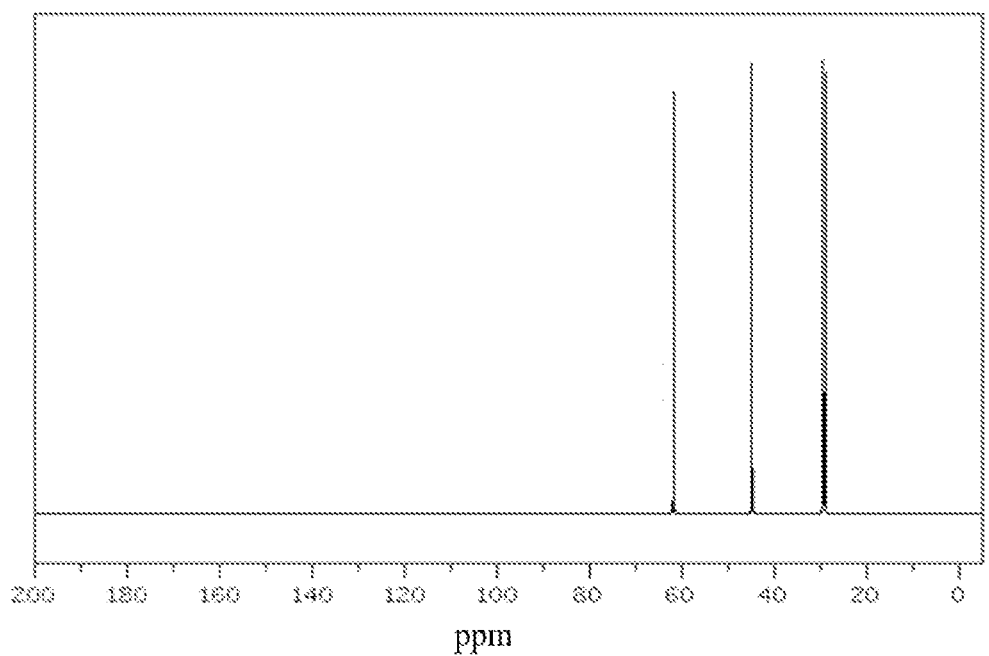
FIG. 1 is the NMR carbon spectrum of boron trifluoride-4-fluoro-1-butanol complex prepared in Example 1.

With tetramethylsilane (TMS) as the internal standard and D$_2$O as the external standard lock solvent, the NOVA 400 MHz NMR spectrometer was set to adjust the relevant parameters of the instrument and the resultant boron trifluoride-4-fluoro-1-butanol complex was characterized by $^{13}$C NMR to obtain the NMR carbon spectrum as shown in FIG. 1.

As shown in FIG. 1, the δ values of α-C, β-C, ω-C, and γ-C atoms of the boron trifluoride-4-fluoro-1-butanol complex were located at 61.6 ppm, 44.3 ppm, 28.4 ppm, and 26.6 ppm, respectively. In addition, the NMR carbon spectra of the catalyst compositions in Example 3, Example 5, and Example 10 were similar to this spectrum, except that there were some shifts in α-C and β-C. As the electron-withdrawing ability of the introduced group increases, the α-C atom shifts toward the low field and high δ value, while the β-C atom changes in the opposite trend. In addition, the main catalyst $BF_3$ molecule itself has a strong electron-withdrawing induction effect. When forming the B—O coordination bond, $BF_3$ also has an electron-withdrawing induction effect on the adjacent atoms (C and H atoms on α-C) in order to attract electrons as much as possible, resulting in enhanced de-shielding effect and decreased electron cloud density in the corresponding atom, with its δ value showing a shift toward the low field and high shift.

Example 2

The example prepared a catalyst composition, specifically comprising the following steps.

The reactor for preparing the catalyst was thermally purged with nitrogen for 10 min, and after purging with nitrogen, a refined cocatalyst 3-chloro-1-propanol (1 mol) was added, while stirring was turned on, and the temperature was raised to 40° C. The main catalyst of Lewis acid, boron trifluoride, was added in proportion, and the molar ratio of the main catalyst to the cocatalyst was 0.5. After 0.8 h of reaction, the prepared polymerization catalyst (boron trifluoride-3-chloro-1-propanol complex) was obtained and stored for use.

Figure 2:
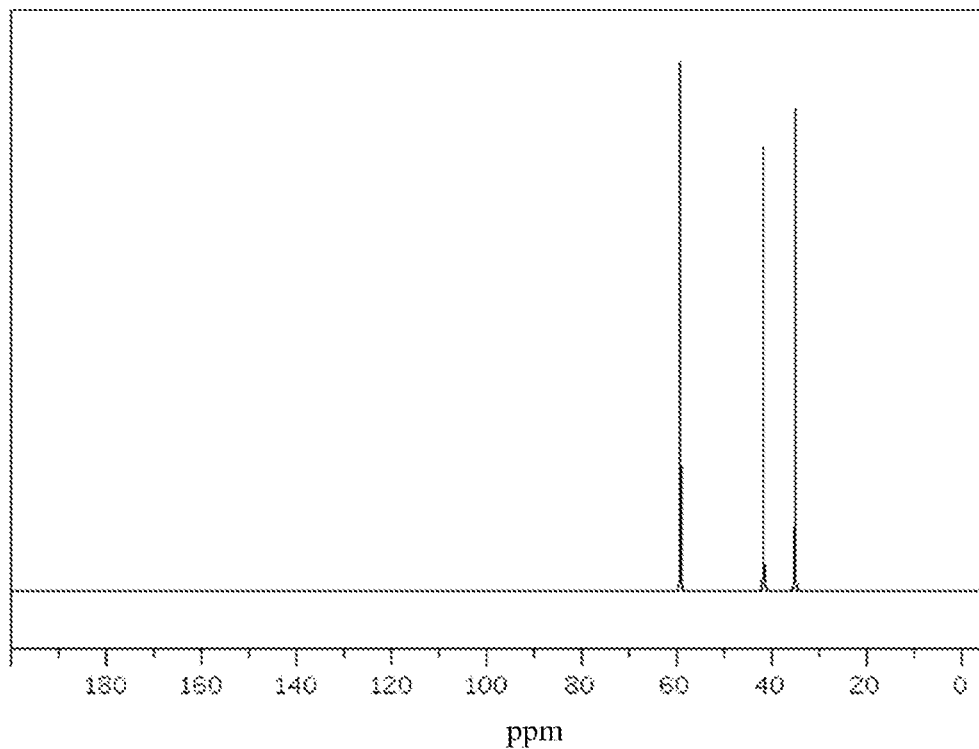
FIG. 2 is the NMR carbon spectrum of boron trifluoride-3-chloro-1-propanol complex prepared in Example 2.
Figure 3:
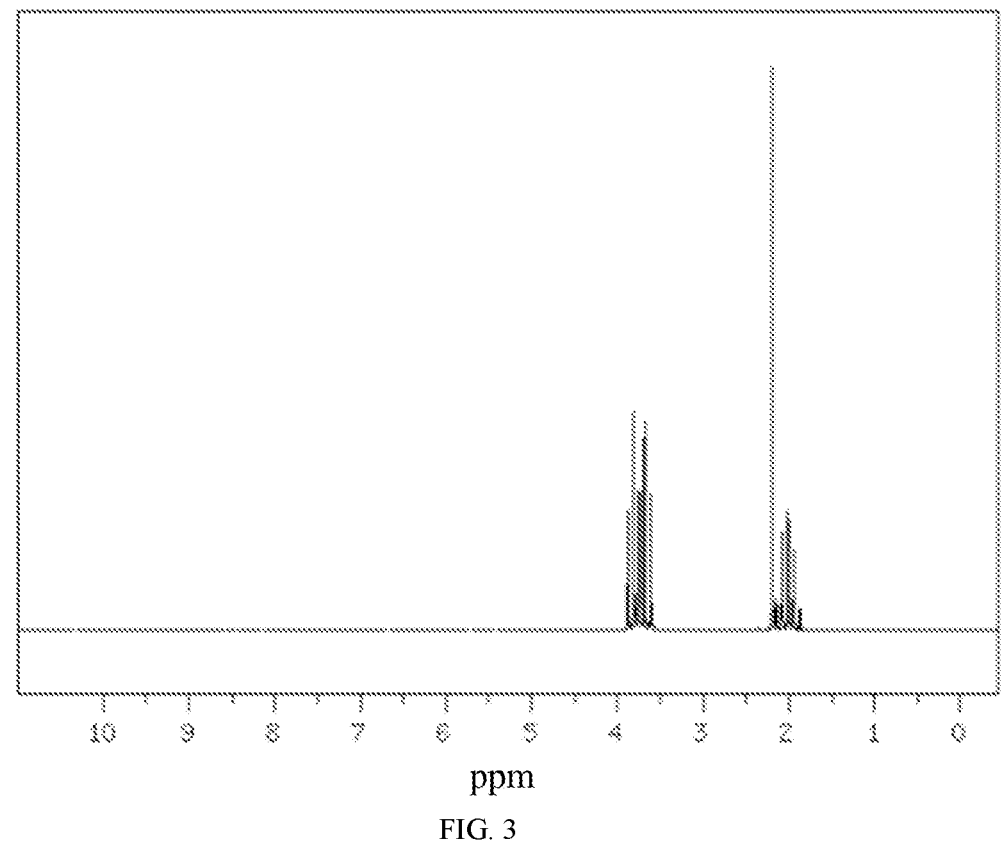
FIG. 3 is the NMR hydrogen spectrum of boron trifluoride-3-chloro-1-propanol complex prepared in Example 2.

With tetramethylsilane (TMS) as the internal standard and $D_2O$ as the external standard lock solvent, the NOVA 400 MHz NMR spectrometer was set to adjust the relevant parameters of the instrument and the boron trifluoride-3-chloro-1-propanol complex was characterized by $^1H$ NMR and $^{13}C$ NMR, as shown in FIGS. 2 and 3.

As shown in FIG. 2, the δ values of α-C, β-C, and ω-C atoms of the boron-3-chloro-1-propanol trifluoride complex were located at 59.1 ppm, 41.3 ppm, and 35.4 ppm, respectively. In addition, the NMR carbon spectra of the catalyst compositions in Example 4 and Example 8 were similar to this spectrum, except that there were some shifts in α-C and β-C. The electron-withdrawing ability of the end-site group is enhanced, and the α-C atom shifts toward the low field and high δ value, while the β-C atom changes in the opposite trend.

As shown in FIG. 3, the δ values of the hydrogen protons in the α-$CH_2$—, β-$CH_2$-, and ω-$CH_2$— groups of the boron trifluoride-3-chloro-1-propanol complex were located at 3.83 ppm to 3.85 ppm, 2.05 ppm to 2.08 ppm and 3.62 ppm to 3.66 ppm, respectively. Boron trifluoride exerts an electron-withdrawing induction effect on the hydrogen protons (2.19 ppm, alcohol hydroxyl hydrogen proton peak) on the 3-chloro-1-propanol ligand, resulting in enhanced de-shielding effect and decreased electron cloud density in the respective hydrogen atoms, and a shift of the corresponding hydrogen atoms toward the low field and high δ values.

Example 3

The example prepared a catalyst composition, specifically comprising the following steps.

The reactor for preparing the catalyst was thermally purged with nitrogen for 10 min, and after purging with nitrogen, a refined cocatalyst 4-chloro-1-butanol (1 mol) was added, while stirring was turned on, and the temperature was raised to 30° C. The main catalyst boron trifluoride was added in proportion, and the molar ratio of the main catalyst to the cocatalyst was 0.8. After 1.0 h of reaction, the prepared polymerization catalyst was obtained and stored for use.

Example 4

The example prepared a catalyst composition, specifically comprising the following steps.

The reactor for preparing the catalyst was thermally purged with nitrogen for 10 min, and after purging with nitrogen, a refined cocatalyst 3-iodo-1-propanol (1 mol) was added, while stirring was turned on, and the temperature was raised to 20° C. The main catalyst aluminum trichloride was added in proportion, and the molar ratio of the main catalyst to the cocatalyst was 1.0. After 1.5 h of reaction, the prepared polymerization catalyst was obtained and stored for use.

Example 5

The example prepared a catalyst composition, specifically comprising the following steps.

The reactor for preparing the catalyst was thermally purged with nitrogen for 10 min, and after purging with nitrogen, a refined cocatalyst 4-bromo-1-butanol (1 mol) was added, while stirring was turned on, and the temperature was raised to 10° C. The main catalyst boron trifluoride was added in proportion, and the molar ratio of the main catalyst to the cocatalyst was 1.5. After 2.0 h of reaction, the prepared polymerization catalyst was obtained and stored for use.

Example 6

The example prepared a catalyst composition, specifically comprising the following steps.

The reactor for preparing the catalyst was thermally purged with nitrogen for 10 min, and after purging with nitrogen, a refined cocatalyst hydroxyacetic acid (1 mol) was added, while stirring was turned on, and the temperature was controlled to 0° C. The main catalyst boron trifluoride was added in proportion, and the molar ratio of the main catalyst to the cocatalyst was 2.0. After 2.5 h of reaction, the prepared polymerization catalyst (boron trifluoride-hydroxyacetic acid complex) was obtained and stored for use.

Figure 4:
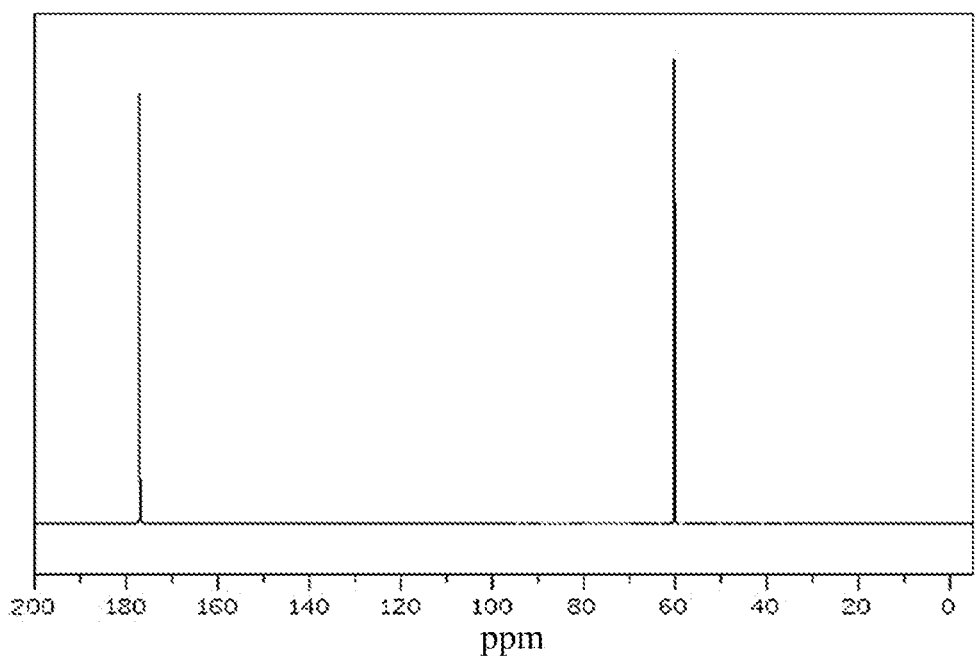
FIG. 4 is the NMR carbon spectrum of boron trifluoride-hydroxyacetic acid complex prepared in Example 6.

With tetramethylsilane (TMS) as the internal standard and $D_2O$ as the external standard lock solvent, the NOVA 400 MHz NMR spectrometer was set to adjust the relevant parameters of the instrument and the resultant boron trifluoride-hydroxyacetic acid complex was characterized by $^{13}C$ NMR to obtain the NMR carbon spectrum as shown in FIG. 4.

As shown in FIG. 4, the δ values of the carbon atom at the carboxyl position and α-C of the boron trifluoride-hydroxyacetic acid complex were located at 177.1 ppm and 60.5 ppm, respectively. In addition, the NMR carbon spectra of the catalyst compositions in Example 7, Example 9, Example 10, Example 13, and Example 14 are similar to this spectrum in that they all have distinct peaks generated by carbon on the carboxyl group, except the number of carbons, and peaks generated by a plurality of secondary carbons.

Example 7

The example prepared a catalyst composition, specifically comprising the following steps.

The reactor for preparing the catalyst was thermally purged with nitrogen for 10 min, and after purging with nitrogen, a refined cocatalyst 6-hydroxyhexanoic acid (1 mol) was added, while stirring was turned on, and a circulation cooler was turned on to control the temperature at −10° C. The main catalyst iron bromide was added in proportion, and the molar ratio of the main catalyst to the cocatalyst was 2.5. After 3.0 h of reaction, the prepared polymerization catalyst was obtained and stored for use.

Example 8

The example prepared a catalyst composition, specifically comprising the following steps.

The reactor for preparing the catalyst was thermally purged with nitrogen for 10 min, and after purging with nitrogen, a refined cocatalyst 3-nitropropanol (1 mol) was added, while stirring was turned on, and a circulation cooler was turned on to control the temperature at −10° C. The main catalyst boron trifluoride was added in proportion, and the molar ratio of the main catalyst to the cocatalyst was 3.0. After 4.0 h of reaction, the prepared polymerization catalyst was obtained and stored for use.

Example 9

The example prepared a catalyst composition, specifically comprising the following steps.

The reactor for preparing the catalyst was thermally purged with nitrogen for 10 min, and after purging with nitrogen, a refined cocatalyst 2-hydroxyethanesulfonic acid (1 mol) was added, while stirring was turned on, and a circulation cooler was turned on to control the temperature at −20° C. The main catalyst boron trifluoride was added in proportion, and the molar ratio of the main catalyst to the cocatalyst was 2.0. After 1.0 h of reaction, the prepared polymerization catalyst was obtained and stored for use.

Example 10

The example prepared a catalyst composition, specifically comprising the following steps.

The reactor for preparing the catalyst was thermally purged with nitrogen for 10 min, and after purging with nitrogen, a refined cocatalyst 4-hydroxybutanesulfonic acid (1 mol) was added, while stirring was turned on, and a circulation cooler was turned on to control the temperature at −30° C. The main catalyst boron trifluoride was added in proportion, and the molar ratio of the main catalyst to the cocatalyst was 0.5. After 2.0 h of reaction, the prepared polymerization catalyst was obtained and stored for use.

Example 11

The example prepared a catalyst composition, specifically comprising the following steps.

The reactor for preparing the catalyst was thermally purged with nitrogen for 10 min, and after purging with nitrogen, a refined cocatalyst 6-hydroxy-2-hexanone (1 mol) was added, while stirring was turned on, and a circulation cooler was turned on to control the temperature at −10° C. The main catalyst boron trifluoride was added in proportion, and the molar ratio of the main catalyst to the cocatalyst was 1.5. After 0.7 h of reaction, the prepared polymerization catalyst was obtained and stored for use.

Example 12

The example prepared a catalyst composition, specifically comprising the following steps.

The reactor for preparing the catalyst was thermally purged with nitrogen for 10 min, and after purging with nitrogen, a refined cocatalyst 5-hydroxyvaleraldehyde (1 mol) was added, while stirring was turned on, and a circulation cooler was turned on to control the temperature at −30° C. The main catalyst boron trifluoride was added in proportion, and the molar ratio of the main catalyst to the cocatalyst was 0.6. After 1.0 h of reaction, the prepared polymerization catalyst was obtained and stored for use.

Example 13

The example prepared a catalyst composition, specifically comprising the following steps.

The reactor for preparing the catalyst was thermally purged with nitrogen for 10 min, and after purging with nitrogen, a refined cocatalyst 8-hydroxyoctanoic acid (1 mol) was added, while stirring was turned on, and a circulation cooler was turned on to control the temperature at −20° C. The main catalyst boron trifluoride was added in proportion, and the molar ratio of the main catalyst to the cocatalyst was 1.2. After 2.0 h of reaction, the prepared polymerization catalyst was obtained and stored for use.

Example 14

The example prepared a catalyst composition, specifically comprising the following steps.

The reactor for preparing the catalyst was thermally purged with nitrogen for 10 min, and after purging with nitrogen, a refined cocatalyst 10-hydroxydecanoic acid (1 mol) was added, while stirring was turned on, and the temperature was controlled at 10° C. The main catalyst boron trifluoride was added in proportion, and the molar ratio of the main catalyst to the cocatalyst was 0.5. After 4.0 h of reaction, the prepared polymerization catalyst was obtained and stored for use.

Example 15

The example prepared a catalyst composition, specifically comprising the following steps.

The reactor for preparing the catalyst was thermally purged with nitrogen for 10 min, and after purging with nitrogen, refined cocatalysts 4-fluoro-1-butanol (0.5 mol) and 6-hydroxy-hexanoic acid (0.5 mol) (a molar ratio of 4-fluoro-1-butanol to 6-hydroxy-hexanoic acid of 1:1) were added, while stirring was turned on, and the temperature was controlled at 10° C. The main catalyst boron trifluoride was added in proportion, and the molar ratio of the main catalyst to the cocatalyst was 0.6. After 3.0 h of reaction, the prepared polymerization catalyst was obtained and stored for use.

Example 16

The example prepared a catalyst composition, specifically comprising the following steps.

The reactor for preparing the catalyst was thermally purged with nitrogen for 10 min, and after purging with nitrogen, refined cocatalysts 3-nitropropanol (1 mol) and 4-hydroxybutanesulfonic acid (0.5 mol) (a molar ratio of 3-nitropropanol to 4-hydroxybutanesulfonic acid of 2:1) were added, while stirring was turned on, and the temperature was controlled at 10° C. The main catalyst boron trifluoride was added in proportion, and the molar ratio of the main catalyst to the cocatalyst was 1.0. After 2.0 h of reaction, the prepared polymerization catalyst was obtained and stored for use.

Example 17

The example prepared a catalyst composition, specifically comprising the following steps.

The reactor for preparing the catalyst was thermally purged with nitrogen for 10 min, and after purging with nitrogen, refined cocatalysts 5-hydroxyvaleraldehyde (1 mol), 10-hydroxydecanoic acid (1 mol) and 4-chloro-1-butanol (1 mol) (a molar ratio of 5-hydroxyvaleraldehyde, 10-hydroxydecanoic acid and 4-chloro-1-butanol of 1:1:1) were added, while stirring was turned on, and the temperature was controlled at 20° C. The main catalyst boron trifluoride was added in proportion, and the molar ratio of the main catalyst to the cocatalyst was 0.8. After 4.0 h of reaction, the prepared polymerization catalyst was obtained and stored for use.

Comparative Example 1

The comparative example prepared a catalyst composition, specifically comprising the following steps.

The reactor for preparing the catalyst was thermally purged with nitrogen for 10 min, and after purging with nitrogen, a refined cocatalyst 4-fluoro-1-butanol (1 mol) was added, while stirring was turned on, and the temperature was controlled at 50° C. The main catalyst boron trifluoride was added in proportion, and the molar ratio of the main catalyst to the cocatalyst was 4.0. After 0.5 h of reaction, the prepared polymerization catalyst was obtained and stored for use.

Comparative Example 2

The comparative example prepared a catalyst composition, specifically comprising the following steps.

The reactor for preparing the catalyst was thermally purged with nitrogen for 10 min, and after purging with nitrogen, a refined cocatalyst 4-fluoro-1-butanol (1 mol) was added, while stirring was turned on, and the temperature was controlled at 50° C. The main catalyst boron trifluoride was added in proportion, and the molar ratio of the main catalyst to the cocatalyst was 0.05. After 0.5 h of reaction, the prepared polymerization catalyst was obtained and stored for use.

Comparative Example 3

The comparative example prepared a catalyst composition, specifically comprising the following steps.

The reactor for preparing the catalyst was thermally purged with nitrogen for 10 min, and after purging with nitrogen, a refined cocatalyst butanol (1 mol) was added, while stirring was turned on, and the temperature was controlled at 50° C. The main catalyst boron trifluoride was added in proportion, and the molar ratio of the main catalyst to the cocatalyst was 0.1. After 0.5 h of reaction, the prepared polymerization catalyst was obtained and stored for use.

Comparative Example 4

The comparative example prepared a catalyst composition, specifically comprising the following steps.

The reactor for preparing the catalyst was thermally purged with nitrogen for 10 min, and after purging with nitrogen, a refined cocatalyst isopropyl alcohol (1 mol) was added, while stirring was turned on, and the temperature was controlled at 50° C. The main catalyst boron trifluoride was added in proportion, and the molar ratio of the main catalyst to the cocatalyst was 0.1. After 0.5 h of reaction, the prepared polymerization catalyst was obtained and stored for use.

Comparative Example 5

The comparative example prepared a catalyst composition, specifically comprising the following steps.

The reactor for preparing the catalyst was thermally purged with nitrogen for 10 min, and after purging with nitrogen, a refined cocatalyst acetic acid (1 mol) was added, while stirring was turned on, and the temperature was controlled at 50° C. The main catalyst boron trifluoride was added in proportion, and the molar ratio of the main catalyst to the cocatalyst for use.

Comparative Example 6

The comparative example prepared a catalyst composition, specifically comprising the following steps.

The reactor for preparing the catalyst was thermally purged with nitrogen for 10 min, and after purging with nitrogen, a refined cocatalyst deionized water (1 mol) was added, while stirring was turned on, and the temperature was controlled at 50° C. The main catalyst boron trifluoride was added in proportion, and the molar ratio of the main catalyst to the cocatalyst was 0.1. After 0.5 h of reaction, the prepared polymerization catalyst was obtained and stored for use.

Comparative Example 7

The comparative example prepared a catalyst composition, specifically comprising the following steps.

The reactor for preparing the catalyst was thermally purged with nitrogen for 10 min, and after purging with nitrogen, a refined cocatalyst ethyl acetate (1 mol) was added, while stirring was turned on, and the temperature was controlled at 50° C. The main catalyst boron trifluoride was added in proportion, and the molar ratio of the main catalyst to the cocatalyst was 0.1. After 0.5 h of reaction, the prepared polymerization catalyst was obtained and stored for use.

Comparative Example 8

The comparative example prepared a catalyst composition, specifically comprising the following steps.

The reactor for preparing the catalyst was thermally purged with nitrogen for 10 min, and after purging with nitrogen, a refined cocatalyst phosphoric acid (1 mol) was added, while stirring was turned on, and the temperature was controlled at 50° C. The main catalyst boron trifluoride was added in proportion, and the molar ratio of the main catalyst to the cocatalyst was 0.1. After 0.5 h of reaction, the prepared polymerization catalyst was obtained and stored for use.

Comparative Example 9

The comparative example prepared a catalyst composition, specifically comprising the following steps.

The reactor for preparing the catalyst was thermally purged with nitrogen for 10 min, and after purging with nitrogen, a refined cocatalyst dimethyl ether (1 mol) was added, while stirring was turned on, and the temperature was controlled at 50° C. The main catalyst boron trifluoride was added in proportion, and the molar ratio of the main catalyst to the cocatalyst for use.

Comparative Example 10

The comparative example prepared a catalyst composition, specifically comprising the following steps.

The reactor for preparing the catalyst was thermally purged with nitrogen for 10 min, and after purging with nitrogen, a refined cocatalyst acetone (1 mol) was added, while stirring was turned on, and the temperature was controlled at 50° C. The main catalyst boron trifluoride was added in proportion, and the molar ratio of the main catalyst to the cocatalyst was 0.1. After 0.5 h of reaction, the prepared polymerization catalyst was obtained and stored for use.

Catalyst Performance Evaluation Test:

Using 1-decene as the raw material, the raw material was firstly fed into the tank polymerization reactor, and each of the catalyst compositions prepared in Examples 1 to 17 and Comparative Examples 1 to 4 was added to the polymerization reactor continuously, where the amount of the catalyst composition was 1.0 wt. % (mass fraction of 1-decene raw material), and the reaction temperature was controlled at 25° C., and the residence time was all 60 min. After the reaction, the catalyst was separated and the product was obtained after hydrogenation. The product was collected for chromatographic analysis and performance testing, and the results were shown in Tables 1 and 2.

TABLE 1

Preparation conditions of the catalyst compositions in each of Examples and Comparative Examplex and the performance parameters of the obtained corresponding product

| No. | Cocatalyst | Molar ratio of $BF_3$ to cocatalyst | Catalyst preparation conditions | | KV100° C./ $mm^2/s$ | Viscosity index | Pour point/° C. |
|---|---|---|---|---|---|---|---|
| | | | Temperature/° C. | Time/h | | | |
| Example 1 | 4-fluoro-1-butanol | 0.1 | 50 | 0.5 | 4.03 | 137 | −60° C. |
| Example 2 | 3-chloro-1-propanol | 0.5 | 40 | 0.8 | 5.02 | 139 | −60° C. |
| Example 3 | 4-chloro-1-butanol | 0.8 | 30 | 1.0 | 4.06 | 136 | −60° C. |
| Example 4 | 3-iodo-1-propanol | 1.0 | 20 | 1.5 | 4.12 | 135 | −60° C. |
| Example 5 | 4-bromo-1-butanol | 1.5 | 10 | 2.0 | 6.04 | 142 | −60° C. |
| Example 6 | hydroxyacetic acid | 2.0 | 0 | 2.5 | 4.18 | 138 | −57° C. |
| Example 7 | 6-hydroxyhexanoic acid | 2.5 | −10 | 3.0 | 4.01 | 135 | 1 |
| Example 8 | 3-nitropropanol | 3.0 | −10 | 4.0 | 4.10 | 139 | −60° C. |
| Example 9 | 2-hydroxyethanesulfonic acid | 2.0 | −20 | 1.0 | 5.21 | 140 | −57° C. |
| Example 10 | 4-hydroxy butanesulfonic acid | 0.5 | −30 | 2.0 | 6.12 | 142 | −57° C. |
| Example 11 | 6-hydroxy-2-hexanone | 1.5 | −10 | 0.7 | 5.42 | 142 | −57° C. |
| Example 12 | 5-hydroxyvaleraldehyde | 0.6 | −30 | 1.0 | 6.35 | 145 | −57° C. |
| Example 13 | 8-hydroxyoctanoic acid | 1.2 | −20 | 2.0 | 6.32 | 149 | −57° C. |
| Example 14 | 10-hydroxydecanoic acid | 0.5 | 10 | 4.0 | 4.15 | 136 | −57° C. |
| Example 15 | 4-fluoro-1-butanol 6-hydroxy-hexanoic acid | 0.6 | 10 | 3.0 | 4.25 | 140 | −60° C. |
| Example 16 | 4-hydroxy butan 3-nitropropanol esulfonic acid | 1.0 | 10 | 2.0 | 4.11 | 138 | −60° C. |
| Example 17 | 5-hydroxyvaleraldehyde 10-hydroxydecanoic acid 4-chloro-1-butanol | 0.8 | 20 | 4.0 | 6.53 | 147 | −60° C. |
| Comparative Example 1 | 4-fluoro-1-butanol | 4.0 | 50 | 0.5 | 4.26 | 125 | −57° C. |
| Comparative Example 2 | 4-fluoro-1-butanol | 0.05 | 50 | 0.5 | 4.18 | 127 | −54° C. |
| Comparative Example 3 | butanol | 0.1 | 50 | 0.5 | 4.02 | 120 | −60° C. |
| Comparative Example 4 | isopropyl alcohol | 0.1 | 50 | 0.5 | 4.11 | 123 | −60° C. |
| Comparative Example 5 | acetic acid | 0.1 | 50 | 0.5 | 4.30 | 130 | −54° C. |
| Comparative Example 6 | deionized water | 0.1 | 50 | 0.5 | 3.98 | 121 | −54° C. |

TABLE 1-continued

Preparation conditions of the catalyst compositions in each of Examples and Comparative Examplex and the performance parameters of the obtained corresponding product

| No. | Cocatalyst | Molar ratio of $BF_3$ to cocatalyst | Catalyst preparation conditions Temperature/° C. | Time/h | KV100° C./ $mm^2$/s | Viscosity index | Pour point/° C. |
|---|---|---|---|---|---|---|---|
| Comparative Example 7 | ethyl acetate | 0.1 | 50 | 0.5 | 4.01 | 123 | −57° C. |
| Comparative Example 8 | phosphoric acid | 0.1 | 50 | 0.5 | 4.14 | 125 | −60° C. |
| Comparative Example 9 | dimethyl ether | 0.1 | 50 | 0.5 | 4.24 | 126 | −57° C. |
| Comparative Example 10 | acetone | 0.1 | 50 | 0.5 | 3.59 | 118 | −57° C. |

TABLE 2

Composition distribution of products prepared by catalyst compositions of each of Examples and Comparative Examples

| NO. | $C_{10}$ | $C_{20}$ | $C_{30}$ | $C_{40}$ | $C_{50}$ | $C_{60}$ or above | $C_{30} + C_{40}$ |
|---|---|---|---|---|---|---|---|
| Example 1 | 1.5 | 4.4 | 57.3 | 33.5 | 1.4 | 1.9 | 90.8 |
| Example 2 | 0.7 | 2.1 | 56.2 | 35.6 | 1.5 | 3.9 | 91.8 |
| Example 3 | 2.2 | 1.7 | 54.3 | 36.3 | 4.3 | 1.21 | 90.6 |
| Example 4 | 2.1 | 3.5 | 53.2 | 37.0 | 1.6 | 2.6 | 90.2 |
| Example 5 | 1.0 | 2.2 | 58.8 | 31.9 | 2.7 | 3.4 | 90.7 |
| Example 6 | 1.2 | 5.8 | 56.3 | 35.2 | 1.3 | 0.2 | 91.5 |
| Example 7 | 0.9 | 5.2 | 55.9 | 34.3 | 0.9 | 2.8 | 90.2 |
| Example 8 | 1.6 | 4.3 | 55.3 | 35.3 | 2.8 | 0.7 | 90.6 |
| Example 9 | 0.1 | 4.4 | 57.3 | 34.9 | 1.4 | 1.9 | 92.2 |
| Example 10 | 0.5 | 2.3 | 52.2 | 39.6 | 1.6 | 3.8 | 91.8 |
| Example 11 | 0.2 | 1.2 | 56.5 | 36.3 | 4.8 | 1.0 | 92.8 |
| Example 12 | 0.1 | 5.5 | 50.2 | 40.0 | 1.0 | 3.2 | 90.2 |
| Example 13 | 0.4 | 2.2 | 52.3 | 39.0 | 2.7 | 3.4 | 91.3 |
| Example 14 | 0.6 | 2.3 | 52.6 | 38.2 | 1.3 | 0.2 | 90.8 |
| Example 15 | 0.9 | 0.8 | 51.6 | 38.4 | 0.9 | 0.7 | 90.0 |
| Example 16 | 0.2 | 4.2 | 60.1 | 32.0 | 2.8 | 0.7 | 92.1 |
| Example 17 | 0.3 | 2.1 | 50.6 | 39.4 | 1.6 | 6.0 | 90.0 |
| Comparative Example 1 | 10.7 | 9.1 | 46.2 | 24.6 | 7.5 | 1.9 | 70.8 |
| Comparative Example 2 | 8.6 | 8.3 | 44.5 | 24.3 | 6.5 | 7.8 | 68.8 |
| Comparative Example 3 | 5.9 | 10.3 | 35.6 | 26.3 | 9.6 | 12.3 | 61.9 |
| Comparative Example 4 | 6.2 | 14.3 | 39.2 | 24.3 | 5.9 | 10.1 | 63.5 |
| Comparative Example 5 | 0.7 | 9.1 | 56.2 | 24.6 | 7.5 | 1.9 | 80.8 |
| Comparative Example 6 | 3.8 | 10.8 | 34.8 | 32.9 | 6.9 | 10.8 | 67.7 |
| Comparative Example 7 | 4.3 | 7.8 | 29.9 | 34.8 | 9.7 | 13.5 | 64.7 |
| Comparative Example 8 | 2.5 | 8.5 | 40.1 | 29.9 | 10.7 | 8.3 | 70.0 |
| Comparative Example 9 | 2.9 | 11.5 | 37.8 | 34.7 | 6.9 | 6.2 | 72.5 |
| Comparative Example 10 | 3.5 | 9.9 | 40.8 | 33.2 | 8.9 | 3.7 | 74.0 |

From the product performance parameters and composition distributions of the above examples, it can be seen that with Lewis acid as the main catalyst and each of 4-fluoro-1-butanol, 3-chloro-1-propanol, 4-chloro-1-butanol, 3-iodo-1-propanol, 4-bromo-1-butanol, hydroxyacetic acid, 6-hydroxy-hexanoic acid, 3-nitropropanol, 4-amino-1-butanol, 4-hydroxybutanesulfonic acid, 6-hydroxy-2-hexanone, 5-hydroxyvaleraldehyde, 8-hydroxyoctanoic acid and 10-hydroxydecanoic acid as the cocatalyst, the obtained base oil has a kinematic viscosity of 4-10 $mm^2$/s at 100° C., a viscosity index greater than 130, and much more target products ($C_{30}+C_{40}$) than Comparative Examples 3 to 10 (using conventional butanol, isopropanol, acetic acid, deionized water, ethyl acetate, phosphoric acid, dimethyl ether, or acetone as cocatalysts).

Figure 5:
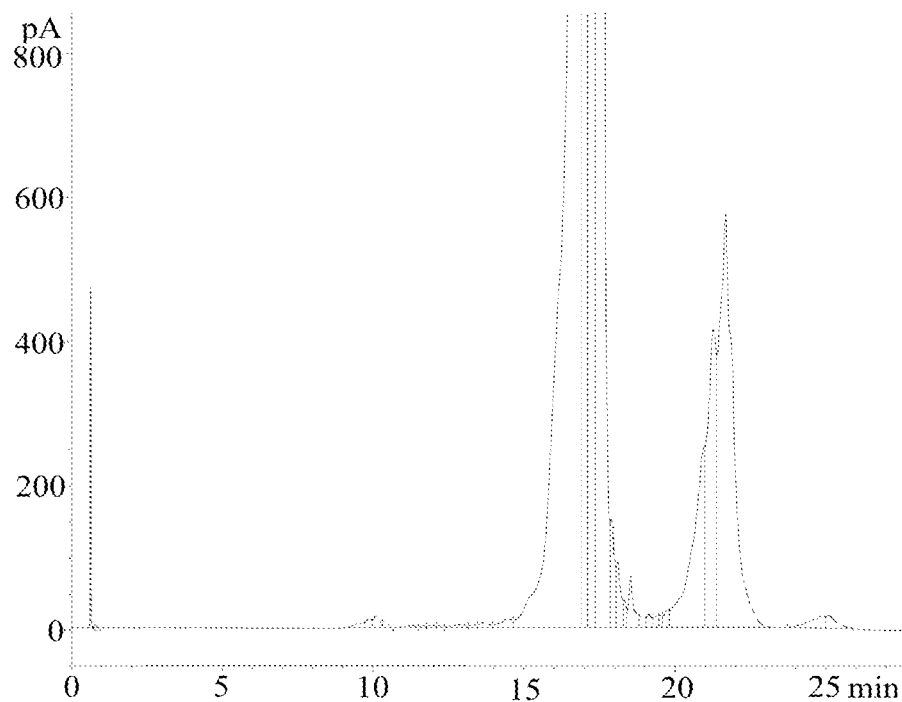
FIG. 5 is the gas chromatogram of the product obtained with the catalyst composition of Example 1.
Figure 6:
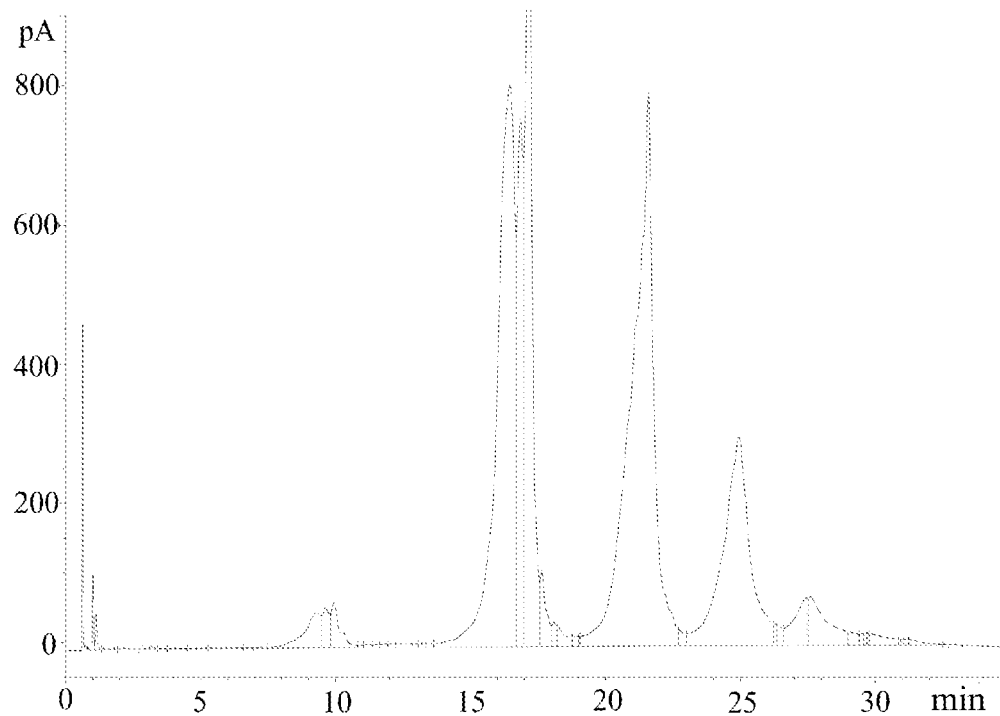
FIG. 6 is the gas chromatogram of the product obtained with the catalyst composition of Comparative Example 3.

The products obtained with the catalyst compositions in Example 1 and Comparative Example 3 are analyzed by gas chromatography, and the results are shown in FIGS. 5 and 6. The product composition obtained with the initiator of the present disclosure is mainly $C_{30}$ and $C_{40}$ (the retention times are 15 to 17 min and 20 to 23 min, respectively, in FIG. 5), while the product composition obtained with butanol as the initiator has a wider distribution, as shown in FIG. 6. The chromatographic analysis is performed using a hydrogen flame ionization detector with a carrier gas of nitrogen and a precolumn pressure of 0.07 MPa, a hydrogen flow rate of 30 mL/min and an air flow rate of 250 mL/min. The inlet temperature is 250° C., the detector temperature is 400° C., the vaporizer temperature is 450° C., and the split ratio is 100:1. Programmed heating is used: the initial temperature is 50° C. and maintained for 10 min; then, the temperature is ramped up to the termination temperature of 380° C. at a heating rate of 9° C./min and maintained for 10 min.

As seen by comparing Example 1 with Comparative Examples 1 and 2, good product performance and high selectivity of target products can be obtained in the range of molar ratios of the main catalyst to the cocatalyst given by the present disclosure.

In addition, performance tests of other α-olefins as the raw material were carried out with the catalyst compositions prepared in Example 1 according to the following process: 1-octene, 1-dodecene, and coal-based α-olefins were used as the raw material, respectively, and the raw material was firstly fed into the tank polymerization reactor, and the catalyst composition prepared in Example 1 was continuously added into the polymerization reactor, wherein the amount of the catalyst composition was 1.0 wt. % (as the mass fraction of α-olefin raw material), the reaction temperature was controlled at 25° C., and the residence time was 60 min. After the reaction, the catalyst was separated and the product was obtained after hydrogenation. The product was collected for chromatographic analysis and performance testing, and the results were shown in Table 3.

As seen from Table 3, the catalyst compositions of the present disclosure are suitable for the polymerization reactions of various α-olefins (1-octene, 1-dodecene, and coal-based α-olefins), and the resultant polymerization products have relatively good viscosity-temperature and low-temperature properties.

TABLE 3

Performance parameters of products obtained with different α-olefin raw materials

| NO. | α-olefin raw materials | KV100° C./mm²/s | Viscosity index | Pour point/° C. |
|---|---|---|---|---|
| 1 | 1-octene | 3.03 | 125 | −60° C. |
| 2 | 1-dodecene | 5.07 | 132 | −60° C. |
| 3 | coal-based α-olefins (C₆-C₁₄ fraction) | 4.15 | 134 | −60° C. |

Obviously, the above examples of the present disclosure are only examples to clearly illustrate the present disclosure, and not limiting the implementation of the present disclosure. For a person of ordinary skill in the art, other variations or changes can be made in different forms on the basis of the above description. It is not possible to exhaust all embodiments herein, but all obvious variations or changes derived from the technical solutions of the present disclosure are still within the protection scope of the present disclosure.

The invention claimed is:

1. A catalyst composition for polymerization of an α-olefin, comprising boron trifluoride and at least one protic cocatalyst;
wherein the protic cocatalyst has a structural formula of:

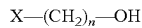

X—(CH$_2$)$_n$—OH where n is an integer selected from 1 to 10;
X is selected from nitro, halogen, cyano, sulfonic acid, and carboxyl groups;
the catalyst composition is a complex of boron trifluoride and the protic cocatalyst, and the molar ratio of boron trifluoride to the protic cocatalyst is from 0.1 to 3.0.

2. The catalyst composition according to claim 1, wherein the protic cocatalyst is one or a combination of two or more selected from 2-nitroethanol, 3-nitropropanol, 2-chloroethanol, 3-chloro-1-propanol, 4-chloro-1-butanol, 5-chloro-1-pentanol, 6-chloro-1-hexanol, 7-chloro-1-heptanol, 8-chloro-1-octanol, 9-chloro-1-nonanol, 10-chloro-1-decanol, 2-fluoroethanol, 3-fluoro-1-propanol, 4-fluoro-1-butanol, 5-fluoro-1-pentanol, 6-fluoro-1-hexanol, 7-fluoro-1-heptanol, 8-fluoro-1-octanol, 9-fluoro-1-nonanol, 10-fluoro-1-decanol, 2-bromoethanol, 3-bromo-1-propanol, 4-bromo-1-butanol, 5-bromo-1-pentanol, 6-bromo-1-hexanol, 7-bromo-1-heptanol, 8-bromo-1-octanol, 9-bromo-1-nonanol, 10-bromo-1-decanol, 2-iodoethanol, 3-iodo-1-propanol, 4-iodo-1-butanol, 5-iodo-1-pentanol, 6-iodo-1-hexanol, 7-iodo-1-heptanol, 8-iodo-1-octanol, 9-iodo-1-nonanol, 10-iodo-1-decanol, 3-hydroxypropionitrile, 4-hydroxybutyronitrile, 2-hydroxyethanesulfonic acid, 3-hydroxypropanesulfonic acid, 4-hydroxybutanesulfonic acid, hydroxyacetic acid, 3-hydroxypropionic acid, 4-hydroxybutyric acid, 6-hydroxyhexanoic acid, 7-hydroxyheptanoic acid, 8-hydroxyoctanoic acid, 9-hydroxynonanoic acid, and 10-hydroxydecanoic acid.

3. The catalyst composition according to claim 1, wherein the protic cocatalyst is one or a combination of two or more selected from 4-fluoro-1-butanol, 3-chloro-1-propanol, 3-iodo-1-propanol, 4-bromo-1-butanol, 6-hydroxyhexanoic acid, 3-nitropropanol, 2-hydroxyethanesulfonic acid, 4-hydroxybutanesulfonic acid, 8-hydroxyoctanoic acid and 10-hydroxydecanoic acid.

4. The catalyst composition according to claim 1, wherein X is selected from halogen and carboxyl.

5. The catalyst composition according to claim 4, wherein the protic cocatalyst is one or a combination of two or more selected from 4-fluoro-1-butanol, 4-bromo-1-butanol and 8-hydroxyoctanoic acid.

6. The catalyst composition according to claim 1, wherein a molar ratio of boron trifluoride to the protic cocatalyst is from 0.5 to 2.0.

7. The catalyst composition according to claim 1, wherein a molar ratio of boron trifluoride to the protic cocatalyst is from 0.8 to 1.5.

8. The catalyst composition according to claim 1, wherein the protic cocatalyst is one or a combination of two or more selected from 4-fluoro-1-butanol, 4-bromo-1-butanol and 8-hydroxyoctanoic acid, and a molar ratio of boron trifluoride to the protic cocatalyst is from 1 to 1.2.

9. A method for preparing a catalyst composition according to claim 1, comprising: mixing the protic cocatalyst with boron trifluoride and carrying out a reaction at a predetermined temperature for a predetermined time to obtain the catalyst composition.

10. The method according to claim 9, wherein the mixing the protic cocatalyst with boron trifluoride comprises: thermally purging with nitrogen a reactor for preparing a catalyst; after purging with nitrogen, adding the protic cocatalyst while turning on stirring; raising the temperature to a predetermined temperature; and adding boron trifluoride in proportion.

11. The method according to claim 9, wherein the predetermined temperature is −30° C. to 50° C.

12. The method according to claim 9, wherein the predetermined time is 0.5 h to 4.0 h.

13. The method according to claim 9, wherein the protic cocatalyst has been subjected to a refining treatment.

14. The method according to claim 13, wherein the refining treatment includes distillation and/or adsorbent removal method, and the water content of the protic cocatalyst after the refining treatment is less than 100 ppm.

15. The method according to claim 9, comprising: thermally purging with nitrogen a reactor for preparing a catalyst for 5 min to 10 min; after purging with nitrogen, adding the refined protic cocatalyst while turning on stirring; controlling the temperature at −30° C. to 50° C.; adding boron trifluoride in proportion; and reacting for 0.5 h to 4.0 h to obtain the catalyst composition.

16. A method of using the catalyst composition according to claim 1 in synthesis of a poly (α-olefin) synthetic base oil, comprising the following steps:
adding a raw material α-olefin to a tank polymerization reactor; adding the catalyst composition continuously to the tank polymerization reactor; controlling the reaction temperature at 20° C. to 50° C. with a residence time of 20 min to 100 min; after the reaction, separating the catalyst, and carrying out hydrogenation to obtain the poly (α-olefin) synthetic base oil.

17. The method according to 16, wherein the catalyst composition is added in an amount of 0.1% to 2.0% by mass of the raw material α-olefin.

18. The method according to claim 9, wherein the predetermined temperature is −10° C. to 30° C.

19. The method according to claim 9, wherein the predetermined time is 0.5 h to 3.0 h.

* * * * *